US012774924B2

(12) United States Patent
Lane et al.

(10) Patent No.: US 12,774,924 B2
(45) Date of Patent: Oct. 27, 2026

(54) SYSTEMS AND METHODS FOR TEMPERATURE DETERMINATION

(71) Applicant: Welch Allyn, Inc., Skaneateles Falls, NY (US)

(72) Inventors: John A. Lane, Venice, FL (US); Scott A. Martin, Camillus, NY (US); Joseph Tari, Baldwinsville, NY (US); Derek Strassle, Port Byron, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 293 days.

(21) Appl. No.: 18/390,562

(22) Filed: Dec. 20, 2023

(65) Prior Publication Data

US 2024/0201021 A1 Jun. 20, 2024

Related U.S. Application Data

(60) Provisional application No. 63/434,077, filed on Dec. 20, 2022.

(51) Int. Cl.

| | |
|---|---|
| ***G01K 1/20*** | (2006.01) |
| ***G01K 1/022*** | (2021.01) |
| ***G01K 13/20*** | (2021.01) |

(52) U.S. Cl.

CPC ............... *G01K 1/20* (2013.01); *G01K 1/022* (2013.01); *G01K 13/223* (2021.01)

(58) Field of Classification Search

CPC ......... G01K 1/20; G01K 1/022; G01K 13/223

See application file for complete search history.

(56) References Cited

U.S. PATENT DOCUMENTS

| | | | |
|---|---|---|---|
| 5,626,139 | A | 5/1997 | Szeles et al. |
| 5,653,239 | A | 8/1997 | Pompei et al. |
| 5,740,809 | A | 4/1998 | Baratta |
| 8,186,876 | B2 | 5/2012 | Mullin et al. |
| 8,568,023 | B2 | 10/2013 | Tanaka |
| 9,506,809 | B2 | 11/2016 | Shin |
| 10,274,383 | B2 | 4/2019 | Bieberich et al. |
| 2005/0094705 | A1 | 5/2005 | Chi |
| 2005/0249263 | A1 | 11/2005 | Yerlikaya et al. |
| 2006/0262829 | A1 | 11/2006 | Manlove et al. |

(Continued)

FOREIGN PATENT DOCUMENTS

| | | |
|---|---|---|
| CN | 111964786 | 8/2021 |
| WO | WO2021194781 A1 | 9/2021 |

OTHER PUBLICATIONS

PCT Search Report and Written Opinion mailed May 2, 2024 for PCT Application No. PCT/US23/85091, 8 pages.

(Continued)

*Primary Examiner* — John E Breene
*Assistant Examiner* — Manuel Salvador Castellon, Jr.
(74) *Attorney, Agent, or Firm* — Lee & Hayes, P.C.

(57) ABSTRACT

A method of determining a temperature of a patient includes measuring a first temperature of the patient with a temperature device, and measuring a second temperature of an environment with the temperature device. The method includes determining if a change in the ambient temperature exceeds a threshold. If the change does exceed the threshold, the method also includes applying a correction factor to the first temperature of the patient to account for the change in ambient temperature.

20 Claims, 6 Drawing Sheets

(56) References Cited

U.S. PATENT DOCUMENTS

| | | | | |
|---|---|---|---|---|
| 2014/0269812 | A1* | 9/2014 | Deutscher | G01K 7/18 374/1 |
| 2015/0148603 | A1 | 5/2015 | Holste | |
| 2015/0250405 | A1 | 9/2015 | Libbus et al. | |
| 2020/0121176 | A1 | 4/2020 | Sidar et al. | |
| 2021/0096032 | A1* | 4/2021 | Lane | G01J 5/0011 |
| 2023/0132835 | A1* | 5/2023 | Kim | G01K 1/16 374/163 |

OTHER PUBLICATIONS

Integration and miniaturization of thermopile-based pyrometric module construction sets; Martin Leiss, et al.; Published Mar. 2005; 11 pages.

* cited by examiner

SYSTEMS AND METHODS FOR TEMPERATURE DETERMINATION

CROSS REFERENCE TO RELATED APPLICATION

This application claims priority to U.S. Provisional Patent Application No. 63/434,077, filed Dec. 20, 2022, titled "SYSTEMS AND METHODS FOR TEMPERATURE DETERMINATION," the entire disclosure of which is incorporated herein by reference.

FIELD OF THE INVENTION

The present disclosure relates to systems and methods for temperature determination and, in particular, to systems and methods for determining patient temperature based at least partly on changes in ambient temperature.

BACKGROUND OF THE INVENTION

Temperature is an important vital sign in patient evaluation. Physicians commonly use a variety of methods for determining patient temperature including, for example, obtaining temperature measurements with a thermometer. While thermometers utilizing mercury have been in existence for many years, modern thermometers typically employ one or more electronic sensors configured to measure patient temperature. Such sensors may take one or more measurements over a relatively short period of time. Based on these measurements, the thermometer may generate an estimated internal and/or core temperature of the patient. In generating this estimated core temperature, it is common practice to insert at least a portion of the thermometer into a disposable cover prior to taking temperature measurements. The cover may overlay the electronic temperature sensor of the thermometer, and may protect the sensor from contamination during use.

Determining core temperature in this way, however, can lead to inaccurate measurements in certain situations. For example, in some situations the thermometer may be stored in an environment having an ambient temperature that fluctuates rapidly. Such rapid ambient temperature changes may affect the temperature of the thermometer itself and, thus, may reduce the accuracy of the temperature measurements made by the thermometer. Moreover, repeated use of the thermometer in a relatively short period of time may also affect the temperature of the thermometer, and may thereby hinder the accuracy of the resulting temperature measurements. While existing thermometers may utilize one or more heating components in an effort to stabilize the temperature of the thermometer prior to and/or during temperature measurement procedures, the use of such heating components has not proven to be a reliable solution for maximizing the accuracy of the temperature determinations made by such devices.

The example embodiments of the present disclosure are directed toward overcoming the deficiencies described above.

SUMMARY

In some examples, the systems and techniques described herein provide a temperature measurement device. The temperature measurement device includes a body and an interface including a component configured to receive an input associated with a temperature measurement of a patient. The device may also include a temperature sensing element enclosed within the body. The temperature sensing element including a temperature sensor configured to detect a temperature of the patient in response to the input; a flex circuit coupled to the temperature sensor having an electrical connection and a data connection; and a memory device coupled to the flex circuit and the data connection. The memory device may store data used to determine the temperature of the patient based on data from the temperature sensor.

In some examples, the temperature sensor may be an infrared temperature sensing element configured to sense a temperature inside a body cavity of the patient. The memory device may store first calibration data from a first calibration process for the temperature sensor. The memory device may also store second calibration data from a second calibration process for the temperature measurement device. In some examples, the calibration data may include first calibration data of the temperature sensor and second calibration data for the temperature measurement device based at least in part on a target temperature range. The calibration data may be communicated to and written to the memory device over the data connection.

In an illustrative example, one general aspect includes a sensing component. The sensing component may include a temperature sensor configured to detect a temperature of a target. The component may also include a memory device that stores data used to determine the temperature of the target based on data from the temperature sensor. The component may also include a flex circuit coupled to the temperature sensor and the memory device, the flex circuit providing an electrical connection and a data connection to the temperature sensor and the memory device.

In some examples, the flex circuit may include a first end coupled to the temperature sensor; a second end opposite the first end, the second end may include the electrical connection and the data connection; a first lateral edge extending from the first end to the second end; and a second lateral edge opposite the first lateral edge, the second lateral edge extending from the first end to the second end. The flex circuit may have a first width extending from the first lateral edge to the second lateral edge proximate the first end, a second width extending from the first lateral edge to the second lateral edge proximate the memory device, and a third width extending from the first lateral edge to the second lateral edge proximate the second end, where the second width is greater than the first width and the third width. The flex circuit may include a first stiffener proximate the memory device and a second stiffener proximate the electrical connection or the data connection. The first stiffener may extend across the second width from the first lateral edge to the second lateral edge and the second stiffener may extend across at least a portion of the third width proximate the second end. The flex circuit may include a first stiffener adhered to the flex circuit proximate the memory device and a second stiffener adhered to the flex circuit proximate the electrical connection or the data connection. The first stiffener may extend across the second width from the first lateral edge to the second lateral edge, the second stiffener extends across at least a portion of the third width proximate the second end, and the flex circuit, first stiffener, and second stiffener may be configured to support the sensing component within a body of a temperature sensing device.

In an illustrative example, one general aspect includes a method of manufacturing a temperature measurement device. The method may include providing a temperature sensing element configured to detect a patient temperature of a patient. The method may also include providing a flex circuit and coupling the temperature sensing element to the flex circuit. The method may further include providing a memory device and coupling the memory device to the flex circuit. The method may also include programming calibration data to the memory device, the calibration data for determining the patient temperature from sensor data. The method may also include programming a controller to determine the patient temperature based on the sensor data and the calibration data.

DETAILED DESCRIPTION

Figure 1:
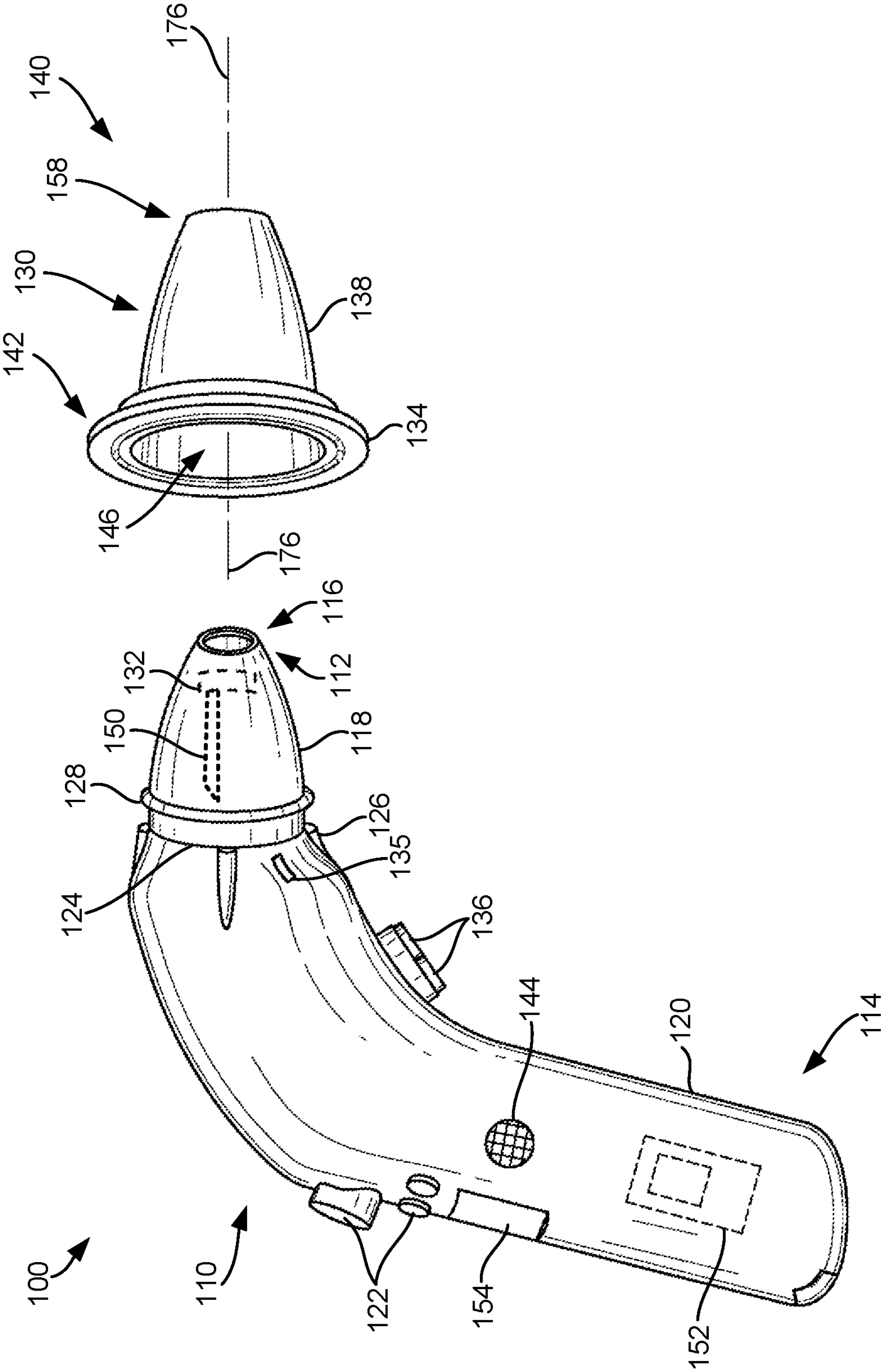
FIG. 1 illustrates a temperature measurement system, according to at least one example.

FIG. 1 illustrates a first example temperature measurement system 100 of the present disclosure including a temperature device 110 and a corresponding probe cover 130. It is understood that the depiction of the temperature device 110 (e.g., a temperature device for use in taking one or more measurements associated with the inner ear of a patient) is merely exemplary. In additional embodiments, the concepts described herein may be applicable to any other medical device that may use a cover, sheath, and/or other structure to protect the device from contaminants present on a surface or in a cavity of the body. Such medical devices may include, for example, probes, endoscopes, speculums, and/or other like devices where the characteristics of the cover, sheath, and/or other like structures impact the accuracy or precision of data gathered or measurements taken by the medical device.

As shown in FIG. 1, the temperature device 110 of example system 100 may include, for example, a head 118 connected to a handle 120. The head 118 may define a distal end 112 of the temperature device 110, and the handle 120 may define a proximal end 114 of the device 110. The head 118 may include an atraumatic tip 116 disposed at the distal end 112. The tip 116 may be sufficiently rounded and/or otherwise configured so as not to cause injury to a patient upon contact with a body surface or at least partial insertion of the head 118 within one or more body cavities of the patient. In an example embodiment in which the temperature device 110 is utilized to measure, calculate, estimate, and/or otherwise determine a temperature of the patient (e.g., a core temperature), it is understood that such body cavities may include the ear, oral cavity, rectal cavity, axilla area, and/or other known body cavities from which temperature may be sensed. Collectively, such body cavities and/or body surfaces may be referred to herein as "patient measurement sites." In further example embodiments, such patient measurement sites may also include a forehead of the patient and/or any other known or easily accessible outer surface of the patient. Such outer surfaces may include the patient's skin or eyes. For instance, a patient measurement site may include an inner canthus and/or an outer canthus of a patient's eye. Additionally, as discussed in more detail below in relation to FIG. 3, examples are considered in which the temperature device 110 measures, calculates, estimates, and/or otherwise determines a temperature of the patient without contacting the patient, such as by measuring thermal radiation emitted by the patient with an infrared sensor.

The head 118 and/or the handle 120 may be made from any material and/or combinations of materials commonly used in medical and/or examination procedures. Such materials may include, for example, plastics, polymers, composites, stainless steel, alloys, and/or any other like materials. Such materials may be suitable for repeated use and/or repeated sanitation. Accordingly, in an example embodiment of the present disclosure, the temperature device 110 and/or its components may be substantially waterproof. One or more waterproof seals may be included and/or otherwise utilized with components of the temperature device 110 to facilitate such repeated sanitation and/or use.

Alternatively, in some example embodiment (not shown) the temperature device 110 may include, for example, a shaft extending from the handle 120. In such embodiments, the atraumatic tip 116 may be disposed at a distal end of the shaft, and the tip may be sufficiently rounded and/or otherwise configured so as not to cause injury to a patient upon contact with and/or at least partial insertion of the shaft within one or more of the patient measurement sites (e.g., the oral cavity, the rectal cavity, etc.) described herein.

With continued reference to FIG. 1, the handle 120 may include one or more operator interfaces 122. Such operator interfaces 122 may be configured to assist in performing one or more functions of the temperature device 110. For example, the operator interfaces 122 may comprise any combination of switches, buttons, levers, knobs, dials, keys, and/or other like components configured to activate, deactivate, manipulate, and/or otherwise control components of the temperature device 110. Such operator interfaces 122 may, for example, assist the user in toggling through and/or selecting one or more modes of operation of the temperature device 10, enabling and/or disabling one or more sensors, alarms, and/or signals associated with operation of the device 110, initiating a single substantially instantaneous temperature determination, initiating a substantially continuous and/or repeating temperature determination, and/or other like modes, functions, or operations.

In the example embodiment shown in FIG. 1, at least one of the operator interfaces 122 may be operably connected to an ejector mechanism 126 disposed proximate a base 124 of the head 118. At least a portion of the temperature device 110 may be inserted into the probe cover 130 before and/or during use, and such an ejector mechanism 126 may be configured to assist in removing the probe cover 130 from the temperature device 110. For example, the ejector mechanism 126 may comprise one or more extensions, flanges, clamps, hooks, shoulders, arms, tabs, rings, and/or other like structures configured to assist in ejecting the probe cover 130 from the base 124 of the head 118 after use. In an example embodiment, one or more such ejector mechanisms 126 may be movable with respect to the base 124 and/or the head 118. In such example embodiments, the ejector mechanisms 126 may be movable in, for example, a path substantially parallel to the head 118. In additional example embodiments, the ejector mechanisms 126 may be movable in an arcuate path relative to the head 118. Movement of the ejector mechanisms 126 may assist in bending, flexing, and/or otherwise deforming at least a portion of the probe cover 130. For example, the ejector mechanisms 126 may be movable along one or more camming surfaces and/or other like external surfaces of the probe cover 130, and such movement may assist in flexing at least a portion of the probe cover 130.

Such flexing may ultimately overcome a retention force provided by one or more retention components 128 of the temperature device 110 and/or by one or more corresponding retention components of the probe cover 130, thereby releasing the probe cover 130 from the temperature device 10. For example, as shown in FIG. 1, a typical retention component 128 of the temperature device 110 may include a raised ring, flange, shoulder, and/or other like structure. Such a retention component 128 may extend partially or completely around, for example, a proximal portion of the head 118, and in example embodiments, one or more such retention components 128 may be disposed about the head 118. Regardless of its form, such a retention component 128 may be configured to releasably mate with a corresponding retention component of the probe cover 130 to assist in releasably coupling the probe cover 130 to the temperature device 110.

In example embodiments, one or more of the operator interfaces 122 may be operably connected to at least one sensor 132 of the temperature device 110. In some examples, the sensor 132 may be embedded within and/or otherwise formed integrally with the head 118 and/or the handle 120. In such example embodiments, it is understood that the sensor 132 may be electrically, operably, and/or otherwise connected to the operator interfaces 122 and/or other components of the temperature device 110 via known electrical connections. Additionally, or alternatively, one or more components of the sensor 132 may be embedded within, disposed on, or disposed proximate at an outer surface/external surface of the head 118 and/or of the tip 116. As will be described in greater detail below, in each of the example embodiments disclosed herein, the sensor 132 may be operably, controllably, electrically, and/or otherwise connected to a controller 152 disposed internal or external to the temperature device 110. In such an example embodiment, the controller 152 may be configured to assist in estimating, calculating, and/or otherwise determining a temperature of a patient based at least partly on signals and/or other inputs from one or more of the sensors (e.g., the at least one sensor 132) described herein.

In an example embodiment, the sensor 132 may be configured to sense one or more vital signs or physical characteristics of a patient such as, for example, temperature, blood pressure, heart rate, blood oxygen concentration, and/or other parameters. In an example embodiment, the sensor 132 may comprise a temperature sensor, such as a thermopile, thermocouple, thermistor, and/or other device configured to sense, measure, detect, and/or otherwise determine a temperature associated with the patient. For example, such a sensor 132 may be configured to sense a temperature of the patient measurement site into which a portion of the temperature device 110 has been inserted and/or with which the temperature device 110 has otherwise been placed in contact. It is understood that in example embodiments, measuring a temperature of the patient by contacting a patient measurement site with the temperature device 110 may include contacting the patient measurement site with the temperature device 110 while a probe cover 130 is disposed on the head 118 or shaft thereof. In such example embodiments, contact between the temperature device 110 and the patient measurement site may include contact between the probe cover 130 and the patient measurement site. For example, in embodiments in which the patient measurement site comprises the patient's ear, a portion of the head 118 of the temperature device 110 shown in FIG. 1 may be inserted into the ear such that a temperature associated with, for example, the tympanic membrane of the patient may be determined. In such embodiments, a probe cover 130 of the temperature device 110 may actually contact the ear and/or portions of the ear canal while the sensor 132 measures the temperature associated with the tympanic membrane. Alternatively, in embodiments in which the patient measurement site comprises the patient's oral cavity, a portion of a shaft of the temperature device 110 may be inserted into the patient's mouth such that a temperature measurement may be taken. In such embodiments, a probe cover 130 of the temperature device 110 may actually contact a surface of the mouth beneath the tongue, and/or other portions of the oral cavity, while the sensor 132 measures an associated temperature.

In example embodiments, the sensor 132 may comprise an infrared temperature sensor such as, for example, a thermopile and/or other like infrared-based temperature sensing components. Such a sensor 132 may be configured to convert thermal energy into electrical energy, and may comprise two or more thermocouples connected in series or in parallel. Such components may be configured to generate an output voltage proportional to a local temperature difference and/or temperature gradient. In an example embodiment in which the sensor 132 comprises at least one thermopile, the temperature device 110 may comprise, for example, an infrared temperature probe and/or other like infrared thermometer. In such embodiments, the sensor 132 may be configured to receive and/or emit radiation, such as thermal and/or infrared radiation. For example, the sensor 132 may be configured to sense, detect, collect, and/or otherwise receive radiation emitted by the patient. Such radiation may be emitted by, for example, the tympanic membrane and/or any of the patient measurement sites described herein. In such embodiments, the sensor 132 may be configured to collect the radiation, and to send a signal to the controller 152 indicative of the collected radiation. The controller 152 may utilize the received signal for any number of functions. For example, the controller 152 may be configured to estimate, infer, calculate, and/or otherwise determine a temperature of the patient (e.g., a core temperature) based at least in part on the signal and/or one or more additional inputs.

The sensor 132 may be configured to collect radiation that is reflected, reemitted, and/or otherwise returned to the sensor 132. For example, at least a portion of such radiation may reflect off of the tympanic membrane and/or may be absorbed and reemitted by the membrane. In such embodiments, the sensor 132 may be configured to collect the reflected and/or reemitted radiation, and to send a signal to the controller 152 indicative of the collected radiation.

Figure 4:
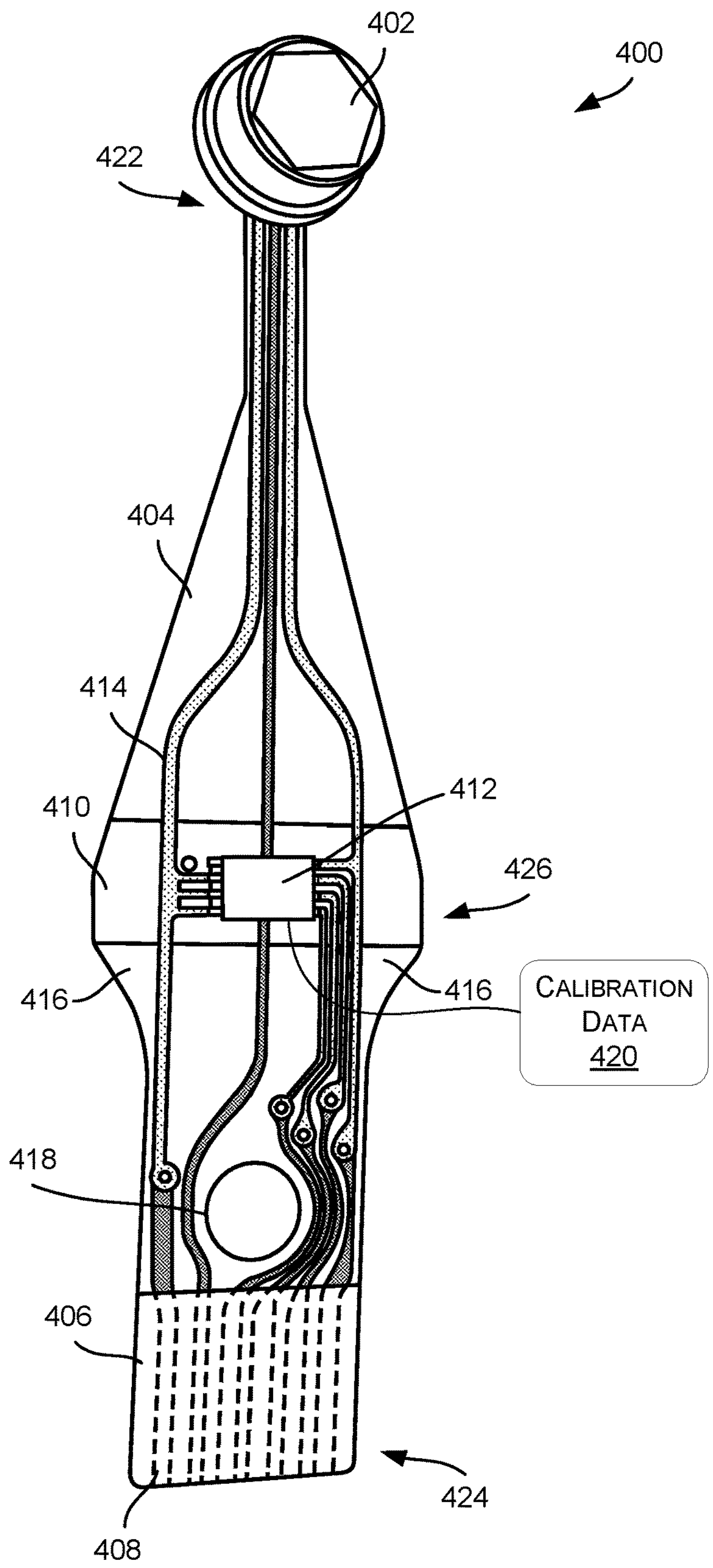
FIG. 4 illustrates a temperature sensing element, according to at least one example.
Figure 5:
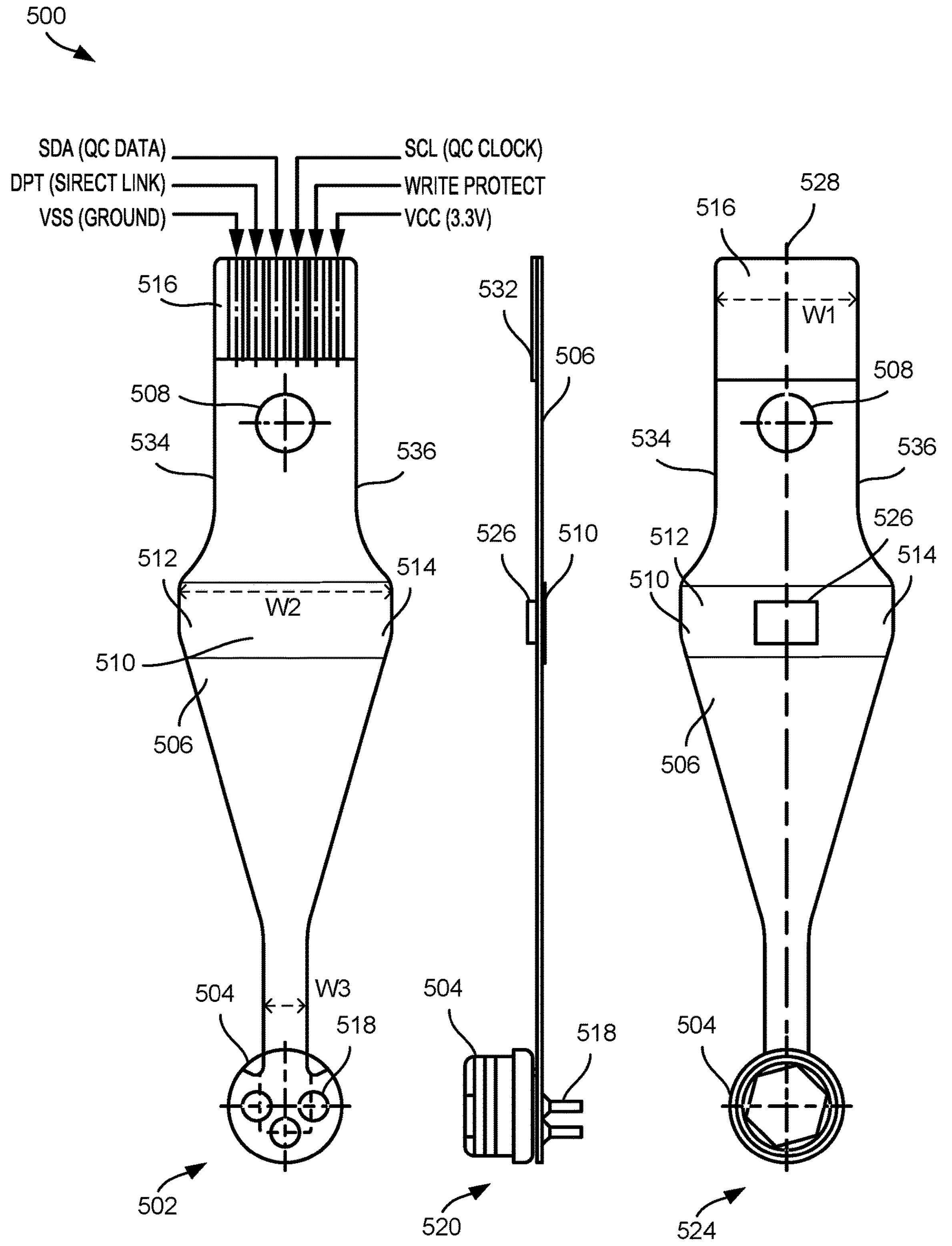
FIG. 5 illustrates views of a temperature sensing element, according to at least one example.

The sensor 132 may be coupled to and/or integrated with a temperature sensing element 150, such as shown and described with respect to FIGS. 4-5 herein. The temperature sensing element 150 may include a flex circuit, memory device, sensor 132, and electrical and data connections. The temperature sensing element 150 includes a calibrated assembly that may be calibrated offline, separate from the temperature device 110, store coefficients related to the calibration, and easily manufactured and/or assembled with the temperature device 110. In particular, the temperature sensing element 150 includes a flex circuit formed of a semi-rigid material, a memory device (e.g., an EEPROM), and the sensor 132.

The temperature sensing element 150 includes the sensor 132 that may include a thermopile assembled together with a "proportional to absolute temperature" (PTAT) sensor and a memory device all coupled to a semi-rigid flex PCB. The sensor 132 may be calibrated at various temperature ranges, for example room temperature, based on an intended use for the temperature device 110 and the coefficients related to the calibration may be stored on the memory device. In some examples, the memory device includes the calibration coefficients as well as offsets used for calibrating the sensor 132. In this manner, the sensor 132 may be calibrated, for example with a first calibration, prior to assembling the temperature device 110. The first calibration may then be stored on the memory device. Additionally, the sensor 132 may be calibrated after assembly into the temperature device 110, with the second calibration occurring and having second calibration data stored on the memory device. In some examples, the first and second calibrations may include different calibrations steps and processes and/or different temperature ranges for calibrating the sensor. For example, the first calibration may calibrate the sensor to a wide temperature range, such as a temperature range of fifty degrees Celsius, or more, while the second calibration may calibrate the sensor to a narrow range, such as less than ten degrees Celsius. In this manner, the sensor 132 may be calibrated for high accuracy within the range of the second calibration. The memory device may also store identifier data that may include information related to a calibration station, calibration process, date of manufacture, unique ID, and other such information related to the specific temperature sensing element 150.

In an example, the information including the calibration data and the identifier data may be stored in the memory device of the temperature sensing element 150. The memory device may include space provided to store data unique to each sensor, such as serial numbers, calibration coefficients, etc. The memory device may be read-only, such as an EEPROM, or may, in some examples include write ability as well. Data may be read and/or written to the memory device through a data interface, such as an I/C bus interface.

The temperature sensing element 150 includes the sensor 132 that produces a voltage proportional to IR-radiation. The voltage may be digitized using an analog-to-digital converter. A reference temperature of the sensor 132 may include a linear reference sensor temperature that is proportional to the temperature change. The reference temperature may also be digitized using a separate analog-to-digital converter. Both signals may be filtered through a low-pass filter to reduce noise. The digitized data may be provided through a serial interface for determining the temperature of a patient. Additionally, the memory device may communicate the calibration data for the sensor and information related to the assembly. A communication interface, such as the data connection may provide the sensor data as well as access to the calibration data from the memory device for the temperature device 110 to determine the temperature of the patient.

The memory device may store first calibration data from a first calibration process for the sensor 132. The memory device may also store second calibration data from a second calibration process for the temperature device 110, the first calibration process may be different from the second calibration process. The memory device may store calibration data including first calibration data of the sensor 132 and second calibration data for the temperature device 110 based at least in part on a target temperature range. The calibration data may be communicated to and written to the memory device over the data connection.

The sensor 132 and memory device are coupled to a flex circuit that includes a flex PCB with electrical and data connections. The flex circuit may electrically connect the memory device, sensor, and a connection interface for connecting with other components of the temperature device 110. The flex circuit may include a first end coupled to the temperature sensor and a second end opposite the first end. The second end may include the electrical connection and/or data connection. The flex circuit has a first lateral edge extending from the first end to the second end and a second lateral edge opposite the first lateral edge, the second lateral edge extending from the first end to the second end.

The flex circuit may have a variable width and thickness over the length of the flex circuit from the first end to the second end. The width and the thickness may be measured in directions that are perpendicular to an axis of the temperature sensing element 150, the axis running from the first end to the second end. For example, the flex circuit may have a first width at and/or proximate the first end, measured from the first lateral edge extending across the width of the flex circuit to the second lateral edge. The flex circuit may also have a second width at and/or proximate a location where the memory device couples to the flex circuit, extending from the first lateral edge across the flex circuit to the second lateral edge. The flex circuit may also have a third width at and/or proximate the second end, extending from the first lateral edge across the flex circuit to the second lateral edge. In some examples, the second width, at and/or proximate the location for the memory device to couple, positioned between the first end and the second end, may be greater than both the first width and the third width such that the flex circuit may be supported by internal geometry of the temperature device 110 when assembled. In this manner, the flex circuit may provide stabilizing wings and/or supports to support the flex circuit in place within the head 118.

The flex circuit may include one or more stiffeners and/or portions of the flex circuit having a thickness greater than surrounding portions of the flex circuit. For example, at and/or proximate the electrical and/or data connection at the second end of the flex a stiffener may be adhered to the flex circuit to increase a stiffness of the flex circuit locally and thereby enable easier connection to the electrical and/or data connections. The flex circuit may also include a stiffener at and/or proximate the location where the sensor connects to the flex circuit. The stiffener may include stiffeners known for use with flex circuits for providing mechanical strength and rigidity to the flex circuit for particular purposes. For example, the stiffener may include a second material different from and/or identical to a material forming the flex circuit adhered and/or applied to the flex circuit in the designated location. In some examples, in place of an adhered stiffener, the flex circuit may have a varying thickness for a substrate thereof. In an illustrative example, the stiffener may increase the thickness of the substrate, for example by 20%, 50%, 75%, 100%, or more depending on the desired mechanical rigidity and strength.

In some examples, the flex circuit may also include a stiffener at and/or proximate the location where the memory device couples to the flex circuit. The stiffener may increase the mechanical strength and rigidity at and around the memory device to ensure that the memory device doesn't disconnect from the flex circuit unintentionally. Additionally, the stiffener may provide mechanical support within the body of the temperature device 110. For instance, the stiffener may extend across the width of the flex circuit to provide stabilizing support to rest against internal features of the head 118. The stiffener may include stiffeners known for use with flex circuits for providing mechanical strength and rigidity to the flex circuit for particular purposes. For example, the stiffener may include a second material different from and/or identical to a material forming the flex circuit adhered and/or applied to the flex circuit in the designated location. In some examples, in place of an adhered stiffener, the flex circuit may have a varying thickness for a substrate thereof. In an illustrative example, the stiffener may increase the thickness of the substrate, for example by 20%, 50%, 75%, 100%, or more depending on the desired mechanical rigidity and strength.

The temperature device 110 may additionally include at least one window, lens, and/or other like optical component 136 positioned proximate the sensor 132. For example, such an optical component 136 may be disposed substantially flush and/or coplanar with the outer surface of the head 118. Such optical components 136 may be disposed, for example, at the tip 116 of the temperature device 110, and may be configured to assist in, for example, focusing, directing, and/or otherwise transmitting radiation to the sensor 132 for collection. In additional example embodiments, such optical components 136 may assist in focusing, directing, and/or otherwise transmitting radiation emitted by the sensor 132. Such optical components 136 may also assist in protecting the thermopile, thermocouple, thermistor, and/or other sensor components during use of the temperature device 110, and may assist in forming a substantially fluid tight compartment within the head 118 to protect sensor components from contact with bodily fluids, cleaning solutions, and/or other liquids. It is understood that such optical components 136 may be substantially transparent to assist in the transmission of infrared and/or other types of radiation. In example embodiments, the optical components 136 may comprise one or more convergent, collimating, and/or divergent lenses.

In some examples, the temperature device 110 may also include one or more sensors 135, which may be configured to detect and/or otherwise determine an ambient temperature of an environment. The sensor 135 may comprise any type of sensor, such as a thermocouple and/or thermistor, configured to sense an ambient temperature associated with the environment. In an additional example embodiment, the sensor 135 may comprise an infrared temperature sensor such as, for example, a thermopile and/or another like infrared-based sensor. In still further embodiments, the sensor 135 may comprise an array of pixels and/or other like sensing elements configured to determine an ambient temperature of the environment.

In some examples, the sensor 135 may be configured to convert thermal energy into electrical energy, and may comprise two or more thermocouples connected in series or in parallel. Such components may be configured to generate an output voltage proportional to a local temperature difference and/or temperature gradient. In an example embodiment in which the sensor 135 comprises at least one thermopile, the temperature device 110 may comprise, for example, an infrared thermometer. In such embodiments, the sensor 135 may be configured to receive and/or emit radiation, such as thermal and/or infrared radiation. For example, the sensor 135 may be configured to sense, detect, collect, and/or otherwise receive radiation emitted by various objects the environment. In such embodiments, the sensor 135 may be configured to collect the radiation, and to send a signal to the controller 152 indicative of the collected radiation. The controller 152 may utilize the received signal for any number of functions. For example, the controller 152 may be configured to estimate, infer, calculate, and/or otherwise determine a temperature of the environment based at least in part on the signal and/or one or more additional inputs.

In some cases, the temperature device 110 may include a thermoelectric cooling component (not explicitly pictured) to transfer heat away from components of the temperature device 110 (e.g., the controller 152, the sensor 135, etc.), and/or to reduce a temperature of the temperature device 110 itself. The thermoelectric cooling component may comprise a Peltier cooler, solid state refrigerator, thermoelectric cooler, or other type of cooling device or system. In examples, the controller 152 may determine that a temperature of the temperature device 110 exceeds a threshold temperature (e.g., 80 degrees Fahrenheit, 85 degrees Fahrenheit, etc.), and/or may determine a number of times that the temperature device 110 has been used within a threshold time period (e.g., 2 minutes, 5 minutes, 110 minutes, 1 hour, etc.). If the temperature of the device exceeds the threshold temperature and/or the number of times that the temperature device 110 has been used within the time period exceeds a threshold number of uses (e.g., 10 uses in 2 minutes), the controller 152 may activate the thermoelectric cooling component. The thermoelectric cooling component, once activated, may cool the temperature device 110 to prevent the heat generated by the components of the temperature device 110 from affecting the temperature readings of patients. In this way, accuracy of temperature readings of patients when taken in rapid succession are less likely to be affected by the heat generated by components of the temperature device 110.

Additionally, the controller 152 may be configured to account for different ambient temperature settings that would otherwise result in an inaccurate core temperature calculation. For example, the controller 152 may be configured to determine a rate of change of an ambient temperature of the environment over a first time period (e.g., 0.5 second, 1 second, 2 seconds, 3 seconds, etc.). In some cases, the first time period during which the controller 152 determines the ambient temperature may be at least partially prior to the temperature measurement device 110 calculating a core temperature of the patient, such as before the operator interface 122 receives an indication from a user to initiate temperature measurement. The controller 152 may also determine a second rate of change of the patient temperature over a second time period that at least partially overlaps with the first time period during which the ambient temperature is determined. The rate of change of the patient temperature is described above and below.

The controller 152 may determine that the first rate of change corresponding to the ambient temperature exceeds a threshold rate of change. In but one example, the controller 152 may use a threshold rate of change of +/−1 degree every 0.5 seconds, although any suitable threshold may be used. Based on the controller 152 determining that the rate of change of the ambient temperature is greater than the threshold rate of change, the controller 152 may select a correction factor to apply to the patient temperature measured by the sensor 132.

The sensor 135 may be located on an exterior and/or interior of the temperature device 110, at a location where an ambient temperature of the environment may be collected that is unlikely to be affected by proximity of the patient being measured by the sensor 132, and/or affected by a hand of a person holding the handle 120 of the temperature device 10. As such, the sensor 135 may be positioned away from the handle 120, and/or away from the head 118 of the temperature measurement device 110. The position of the sensor 135 depicted in the example temperature measurement system 100 is intended only as one example position, and other positions of the sensor 135 are also considered, such as proximate the imaging device 60 on a base of the handle 120, proximate the operator interfaces 122, separate from the temperature measurement device 110 (e.g., as part of another device communicatively coupled to the temperature measurement device 110), and so forth.

In example embodiments the temperature device 110 may further include one or more signal devices 144 operably connected to the controller 152, the sensor 132, and/or the ambient sensor 135. Such signal devices 144 may include, for example, one or more lights, LEDs, speakers, and/or other like devices configured to emit an audible and/or optical alarm or signal in response to a command or signal from the controller 152. Such an alarm or other signal may be initiated by, for example, the controller 152 when a temperature determined by the temperature device 110 meets or exceeds a threshold temperature. In additional example embodiments, such an alarm or signal may be initiated during a substantially continuous temperature calculation operation where the rate of patient temperature change meets or exceeds a predetermined temperature change rate threshold. In example embodiments, the signal device 144 may output an alarm or other signal indicating that the temperature device 110 and/or the sensor 132 is disposed outside of the preferred proximity range of the sensor 132. The signal device 144 may also be configured to output a signal indicating when the temperature device 110 and/or the sensor 132 has been positioned within the preferred proximity range.

As discussed above, the temperature device 110 may include one or more displays 154. An example display 154 may be operably connected to the controller. The display 154 may comprise, for example, a liquid crystal display (LCD) screen, a light emitting diode (LED) display, a digital read-out, an interactive touch-screen, and/or any other like components configured to communicate information to the user or control the temperature device 110. Such displays 154 may be configured to indicate, for example, one or more temperatures determined by the sensors 132 and/or 135, one or more temperatures determined based on signals received from the sensors 132 and/or 135, and/or any other information that may be useful during operation of the temperature device 110. The display 154 may also be configured to communicate information indicative of additional physical characteristics of the patient including but not limited to disease state, injury, and emotional state. The display 154 may be configured to communicate such information substantially instantaneously and/or substantially continuously depending on the mode of operation of the temperature device 110. Such a display 154 may also indicate whether or not the temperature device 110 is turned on, and whether a probe cover 130 has been connected to the temperature device 110.

In additional example embodiments, the temperature device 110 may include one or more transmitters, receivers, transceivers and/or other like communication devices (not shown) configured to send information to and/or receive information from a remote device and/or source. In such example embodiments, the temperature device 110 may be configured to send and/or receive any of the information described herein with regard to the display 154, sensors 132, and/or 135, and/or other components of the temperature device 110 via such communication devices. In such embodiments, a communication device of the temperature device 110 may be configured to send and/or receive such information to a remote device and/or source wirelessly via BLUETOOTH®, WIFI®, or other like means. Such a communication device may be disposed at any convenient location on the temperature device 110, and in additional embodiments, such a communication device may be disposed partially and/or completely internal to the temperature device 110.

In still further example embodiments, the display 154 may be configured to communicate information indicative of whether one or more threshold temperatures, threshold temperature change rates, and/or other sensed metric thresholds have been met or exceeded. The display 154 may be configured to display any other typical operating information such as, for example, a temperature vs. time trend line or other graphical depictions.

The controller 152 may be operably connected to the operator interfaces 122, display 154, sensors 132 and/or 135, and/or other components of the temperature device 110, and the controller 152 may be configured to control the operation of such components. In an example embodiment, the controller 152 may be configured to receive signals, information, measurements, and/or other data from the sensors 132 and/or 135 of the temperature device 110, and to determine a temperature value indicative of a core temperature of the patient based on the information received. The controller 152 may also be programmed and/or otherwise configured to execute one or more commands and/or control programs. The controller 152 may comprise memory, additional processors (e.g., a microprocessor or other components generally associated with or included in a computer, a tablet, a mobile phone, or other computing device), and/or other known controller components to facilitate the functionality described herein. In an example embodiment, the controller 152 may be disposed within, for example, the handle 120 of the temperature device 110. In such an embodiment, the handle 120 may form one or more substantially water-tight and/or substantially hermetically sealed compartments for storing the various components of the controller 152.

In example embodiments, the probe cover 130 may include a body 138 having a distal end 140, a proximal end 142, and a substantially atraumatic tip 158 disposed at the distal end 140. As shown in FIG. 1, in example embodiments the probe cover 130 may also include an annular flange 134 disposed at the proximal end 142. The body 138 may be substantially conical, substantially cylindrical, and/or any other suitable shape, and in example embodiments, the body 138 may be similar in shape, size, and/or dimensions to the head 118. For example, the probe cover 130 may be hollow, and the body 138 may be incrementally longer than the head 118 so as to fit over substantially the entire head 118. When mounted on the temperature device 110 shown in FIG. 1, the probe cover 130 may overlay the sensor 132 disposed at the tip 116 of the head 118. The probe cover 130 may define an orifice 146 at the proximal end 142 thereof. The probe cover 130 may have a longitudinal axis 176 extending centrally through the body 138 and the tip 158, and when the probe cover 130 is connected to the temperature device 110 shown in FIG. 1, the longitudinal axis 176 may be substantially collinear with, for example, a central and/or longitudinal axis (not shown) of the sensor 132.

The probe covers 130 described herein may be formed from any medically approved material known in the art. Such materials may include, for example, plastics, polymers, and/or any of the other materials discussed above with regard to the temperature device 110. Using such materials may enable, for example, the probe cover 130 to be repeatedly used and/or sanitized. Such materials may also facilitate formation of the probe cover 130 through any molding, extrusion, and/or other like process known in the art. Such materials and/or processes may enable the probe cover 130 to be formed with any desirable transmissivity, thickness, dimensions, and/or other configurations.

The example temperature measurement system 100 described herein may be utilized by physicians, nurses, health care professionals, and/or other users in a variety of different environments. For example, the temperature devices 110 and/or temperature measurement systems 100 described herein may be employed in any of a number of examination facilities to determine one or more temperatures associated with a patient such as, for example, an estimated core temperature of the patient. Such an estimated core temperature may be utilized by the health care professional to assist in treating the patient, and may have a variety of uses that are well known in the medical field.

The example temperature measurement systems 100 may be utilized to determine patient temperature in a variety of different ways. For example, the temperature devices 110 disclosed herein may be configured to determine patient temperature using one or more contact-based methods of temperature determination. In such contact-based methods, a "contact" mode of the temperature device 110 may be selected using one or more of the operator interfaces 122 described herein. Additionally, a user of the temperature device 110 may insert at least a portion of the temperature device 110 into a corresponding probe cover 130. The user may insert at least a portion of, for example, the head 118 into the probe cover 130, via the orifice 146. In an example embodiment, the probe cover 130 may be disposed within a box or other like storage container (not shown) while the head 118 of the temperature device 110 is inserted into the probe cover 130. In such an example embodiment, the probe cover 130 may be accessed through an opening of the storage container for insertion of the head 118.

As one or more of the retention components 128 of the temperature device 110 comes into contact with the probe cover 130, the retention components 128 may hook, clip, and/or otherwise mate with the proximal end 142 of the probe cover 130 to assist in retaining the probe cover 130. In example embodiments in which the proximal end 142 of the probe cover 130 defines one or more of the notches, cutouts, and/or other concave retention components described above, these retention components may mate with the corresponding retention components 128 of the temperature device 110 to assist in retaining the probe cover 130 thereon.

Once the probe cover 130 has been mounted onto the temperature device 110, the probe cover 130 may be placed into contact with a patient measurement site to facilitate determining an estimated core temperature of the patient. For example, at least a portion of the probe cover 130 shown in FIG. 1 may be inserted into an ear canal of the patient such that the tip 158 is disposed proximate the tympanic membrane of the patient. The probe cover 130 and/or the sensor 132 may be positioned such that the probe cover 130 is in contact with the ear and/or ear canal, and the tympanic membrane is disposed at least partially within the field of view of the sensor 132. Alternatively, the probe cover 130 may be inserted into an axilla area, a rectal cavity, an oral cavity, and/or other like patient measurement site such that the tip 158 is disposed in contact with the measurement site.

Once the probe cover 130 has been placed in contact with the patient measurement site, the sensor 132 may be activated via the operator interfaces 122 to sense a temperature indicative of a temperature of the patient measurement site. For example, in an embodiment in which the sensor 132 comprises a thermocouple and/or a thermistor, the sensor 132 may be utilized to measure the temperature of the measurement site. Alternatively, in embodiments in which the sensor 132 comprises an infrared temperature sensor, the sensor 132 may detect radiation emitted by the measurement site. For example, radiation emitted by the tympanic membrane, oral cavity, axilla area, and/or rectal cavity may be directed to the sensor 132 for collection via the one or more optical components (not pictured). Signals indicative of the patient measurement site temperature may be sent to the controller 152 by the sensor 132, and while the temperature device is operating in the contact mode, the controller 152 may assist in estimating the core temperature based solely on this sensed temperature.

In additional example embodiments, the temperature devices 110 disclosed herein may be configured to determine patient temperature and/or other physical characteristics of the patient using one or more noncontact-based methods of patient evaluation. In such noncontact-based methods, a "noncontact" mode of the temperature device 110 may be selected using one or more of the operator interfaces 122 described herein. In such example noncontact modes of operation, the sensor 132 may be activated via the operator interfaces 122 to determine a temperature indicative of a temperature of the patient measurement site. For example, in an embodiment in which the sensor 132 comprises a thermocouple, a thermopile, and/or an infrared temperature sensor, the sensor 132 may detect radiation emitted by the measurement site. For example, radiation emitted by the forehead, eyes, sinus area, and/or other locations on the outer surface of the patient may be collected by the sensor 132. Such radiation may be directed to the sensor 132 for collection via the one or more optical components 136 associated with the sensor 132. Signals indicative of the patient measurement site temperature may be sent to the controller 152 by the sensor 132, and while the temperature device 110 is operating in the noncontact mode, the controller 152 may assist in estimating the core temperature based solely on this sensed noncontact-based temperature. Such noncontact-based methods of temperature determination may be useful in a variety of applications. Such applications may include initial and/or patient intake screening, and situations in which the patient is uncooperative. Such applications may also include situations in which temperature determination through traditional contact-based methods may place the user at an elevated risk of contact with, for example, germs, viruses, contagious disease, patient bodily fluids, and/or other like substances or contaminants.

In example embodiments in which the temperature device 110 is configured to determine patient temperature and/or other physical characteristics using a noncontact-based method of patient evaluation, one or more components of the temperature device 110 associated with contact-based methods of patient evaluation may be omitted. For example, in such embodiments the optical components 136 may be omitted from the temperature device 110. Omission of such components may reduce the cost and complexity of the temperature device 110 and may be desirable in environments in which noncontact-based patient evaluation methods are adequate for the level of care required.

In further example embodiments, the temperature devices 110 disclosed herein may be configured to determine one or more physical characteristics of a patient, including but not limited to patient temperature, using a combination of a contact-based method of temperature determination and a noncontact-based method of temperature determination and/or patient evaluation. In such methods, a "combination" mode of the temperature device 110 may be selected using one or more of the operator interfaces 122 described herein. Such a combination mode may be useful to assist in determining a variety of physical characteristics of the patient based on one or more comparisons between contact-based and noncontact-based method of patient evaluation. Further, it is understood that the temperature devices 110 of the present disclosure may allow the user to select between the contact mode, noncontact mode, and combination mode of operation depending upon the requirements of each particular application and/or the condition or characteristics of the patient.

While operating in the combination mode, an example method of temperature determination may include determining one or more alignment parameters associated with the position of the temperature device 110 relative to the patient. Such an alignment parameter may be determined using one or more of the sensors described herein, and the alignment parameter may be determined before, during, and/or shortly after determining the temperature indicative of the temperature of the measurement site with the sensor 132. In such embodiments, a temperature value indicative of the patient's core temperature may be determined based on the alignment parameter.

In additional example embodiments, the temperature devices 110 described herein may be capable of automatically configuring and/or reconfiguring themselves depending on the age, gender, and/or other physical characteristics of the patient. For example, such temperature devices 110 may be configured to make a noncontact-based determination of one or more physical characteristics of the patient. Such noncontact-based determinations may be made, for example, by the controller 152 in conjunction with the imaging device 60, sensor 132, and/or any other noncontact-based sensors of the temperature device 10. Such determinations may include, for example, capturing an image of the patient and, through one or more image recognition and/or image processing algorithms, determining an approximate age of the patient. Such images may include, for example, a visual image and/or a thermal image, and such algorithms may also be used to determine, for example, the gender of the patient. Once the gender and/or the approximate age of the patient has been determined, the temperature device 110 may automatically select an appropriate control configuration for future temperature determinations and/or other physical characteristic determinations. For example, if the temperature device 110 determines that the patient is an adult, the temperature device 110 may, in response to the determination, automatically utilize one or more core temperature determination algorithms and/or physical characteristic determination algorithms tailored toward treatment and/or diagnosis of adult patients. Alternatively, if the temperature device 110 determines that the patient is a pediatric patient, the temperature device 110 may, in response to the determination, automatically utilize one or more core temperature determination algorithms and/or physical characteristic determination algorithms tailored toward treatment and/or diagnosis of pediatric patients. A similar "tailored" algorithm and/or process may be employed by the temperature device 110 in response to the determination of patient gender.

Figure 2:
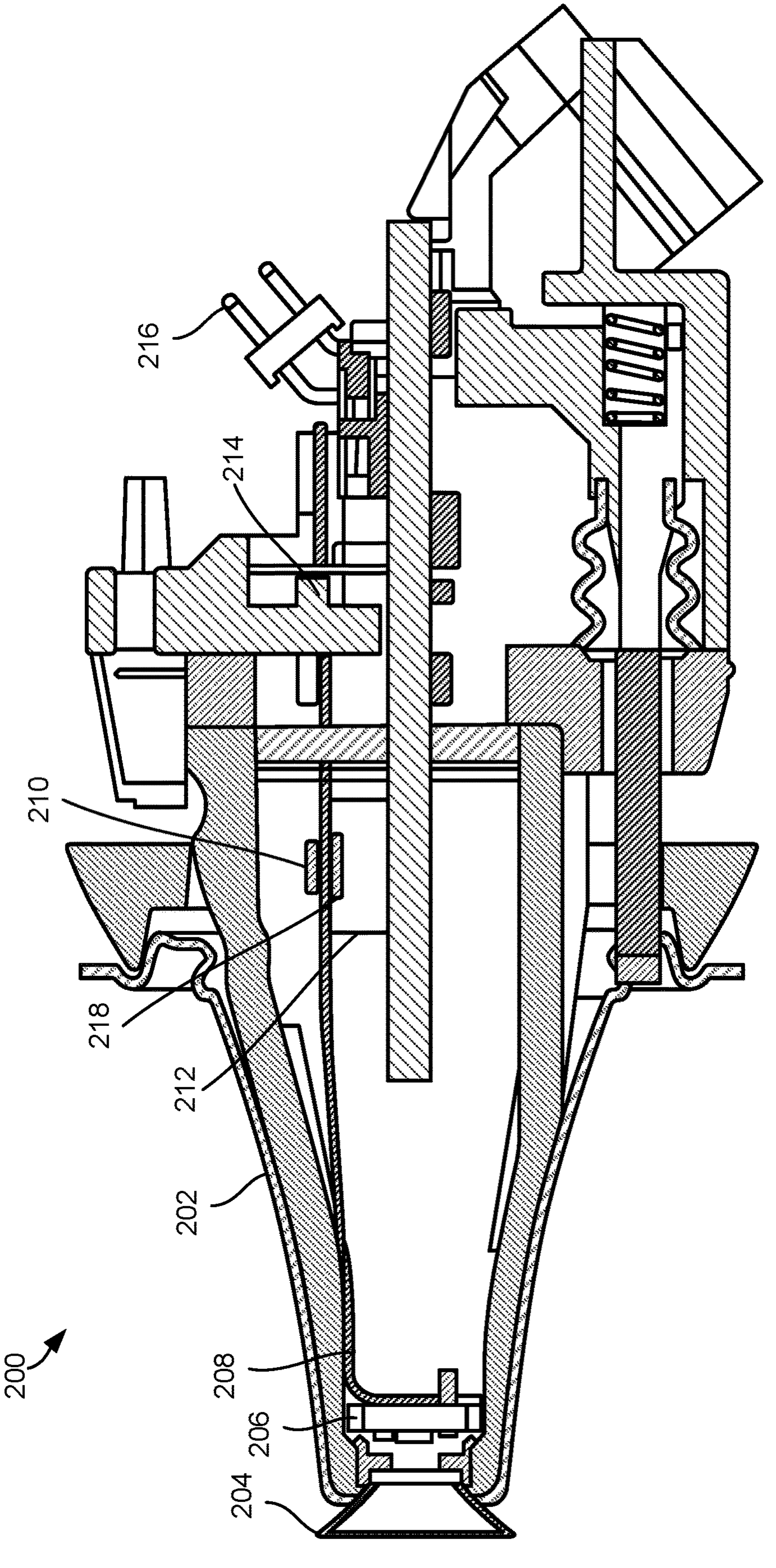
FIG. 2 illustrates a cross-sectional view of a portion of the temperature measurement device of FIG. 1, according to at least one example.

FIG. 2 illustrates a cross-sectional view 200 of a portion of the temperature measurement device of FIG. 1, according to at least one example. For example, the cross-sectional view may correspond to at least a portion of the tip 116 of the head 118 of the temperature measurement device 110. The temperature measurement device is illustrated as having an aperture 204 through a body 202 through which the patient may be sensed by the sensor 206. The sensor 206 may include and/or be similar to the sensor 132 of FIG. 1.

The sensor 206 is coupled to a flex circuit 208 that is also connected to a memory device 210 and connections 216 that may provide power and/or data connections to the sensor 206, memory device 210, and the flex circuit 208. The sensor 206 may be activated in response to a user input, such as through the operator interface 122. The sensor 206 may be configured to sense one or more vital signs or physical characteristics of a patient such as, for example, temperature, blood pressure, heart rate, blood oxygen concentration, and/or other parameters. In an example embodiment, the sensor 206 may comprise a temperature sensor, such as a thermopile, thermocouple, thermistor, and/or other device configured to sense, measure, detect, and/or otherwise determine a temperature associated with the patient. For example, such a sensor 206 may be configured to sense a temperature of the patient measurement site into which a portion of the temperature device has been inserted and/or with which the temperature device has otherwise been placed in contact.

In some examples, the sensor 206 may comprise an infrared temperature sensor such as, for example, a thermopile and/or other like infrared-based temperature sensing components. Such a sensor 206 may be configured to convert thermal energy into electrical energy, and may comprise two or more thermocouples connected in series or in parallel. Such components may be configured to generate an output voltage proportional to a local temperature difference and/or temperature gradient. In an example embodiment in which the sensor 206 comprises at least one thermopile, the temperature device may comprise, for example, an infrared temperature probe and/or other like infrared thermometer.

The sensor 132 may be coupled to and/or integrated with the flex circuit 208 as part of a temperature sensing element. The temperature sensing element includes a calibrated assembly that may be calibrated offline, separate from the temperature device, store coefficients related to the calibration, and easily manufactured and/or assembled with the temperature device. In particular, the temperature sensing element includes the flex circuit 208 formed of a semi-rigid material, a memory device 210 (e.g., an EEPROM), and the sensor 206.

The sensor 206 may be calibrated at various temperature ranges, for example room temperature, and the coefficients related to the calibration may be stored on the memory device. In some examples, the memory device 210 includes the calibration coefficients as well as offsets used for calibrating the sensor 206. In this manner, the sensor 206 may be calibrated, for example with a first calibration, prior to assembling the head 118, which may be assembled as part of assembling the overall temperature device 110. The first calibration may then be stored on the memory device 210. Additionally, the sensor 206 may be calibrated after assembly into the temperature device 110, with the second calibration occurring and having second calibration data stored on the memory device 210. In some examples, the first and second calibrations may include different calibrations steps and processes and/or different temperature ranges for calibrating the sensor 206. For example, the first calibration may calibrate the sensor 206 to a wide temperature range, such as a temperature range of fifty degrees Celsius, or more, while the second calibration may calibrate the sensor to a narrow range, such as less than ten degrees Celsius. In this manner, the sensor 206 may be calibrated for high accuracy within the range of the second calibration.

The memory device 210 may also store identifier data that may include information related to a calibration station, calibration process, date of manufacture, unique ID, and other such information related to the specific temperature sensing element. In an example, the information including the calibration data and the identifier data may be stored in the memory device 210. The memory device 210 may include space provided to store data unique to each sensor 206, such as serial numbers, calibration coefficients, etc. The memory device 210 may be read-only, such as an EEPROM, or may, in some examples include write ability as well. Data may be read and/or written to the memory device 210 through a data interface, such as an I/C bus interface and/or over the connections 216.

The memory device 210 may store first calibration data from a first calibration process for the sensor 206. The memory device 210 may also store second calibration data from a second calibration process for the temperature device 110, the first calibration process may be different from the second calibration process. The memory device 210 may store calibration data including first calibration data of the sensor 206 and second calibration data for the temperature device 110 based at least in part on a target temperature range. The calibration data may be communicated to and written to the memory device 210 over the connection 216.

The sensor 206 and memory device 210 are coupled to the flex circuit 208 including a flex PCB with electrical and data connections. The flex circuit 208 may electrically connect the memory device 210, sensor 206, and a connection 216 for connecting with other components of the temperature device 110. The flex circuit 208 may be held in place and/or secured by a fastener 214 such as a threaded fastener and/or pin that inserts through an opening in the flex circuit 208.

In some examples, the flex circuit 208 may also include a stiffener 218 at and/or proximate the location where the memory device 210 couples to the flex circuit 208. The stiffener 218 may increase the mechanical strength and rigidity of the flex circuit 208 at and around the memory device 210 to ensure that the memory device 210 doesn't disconnect from the flex circuit 208 unintentionally. Additionally, the stiffener 218 may provide mechanical support within the head 118, for example by resting on support 212. In an example, the stiffener 218 may extend across the width of the flex circuit 208 to provide stabilizing support to rest against the support 212.

The stiffener may include stiffeners known for use with flex circuits for providing mechanical strength and rigidity to the flex circuit for particular purposes. For example, the stiffener may include a second material different from and/or identical to a material forming the flex circuit adhered and/or applied to the flex circuit in the designated location. In some examples, in place of an adhered stiffener, the flex circuit may have a varying thickness for a substrate thereof. In an illustrative example, the stiffener may increase the thickness of the substrate, for example by 20%, 50%, 75%, 100%, or more depending on the desired mechanical rigidity and strength.

The aperture 204 may additionally include at least one window, lens, and/or other like optical component positioned proximate the sensor 206. For example, such an optical component may be disposed substantially flush and/or coplanar with the outer surface of the head 118. Such optical components may be configured to assist in, for example, focusing, directing, and/or otherwise transmitting radiation to the sensor 206 for collection. In additional example embodiments, such optical components may assist in focusing, directing, and/or otherwise transmitting radiation emitted by the sensor 206. Such optical components may also assist in protecting the thermopile, thermocouple, thermistor, and/or other sensor components during use of the temperature device 110, and may assist in forming a substantially fluid tight compartment within the head 118 to protect sensor components and other electronics and components from contact with bodily fluids, cleaning solutions, and/or other liquids. It is understood that such optical components may be substantially transparent to signals sensed by the sensor 206 to assist in the transmission of infrared and/or other types of radiation. In example embodiments, the optical components may comprise one or more convergent, collimating, and/or divergent lenses.

Figure 3:
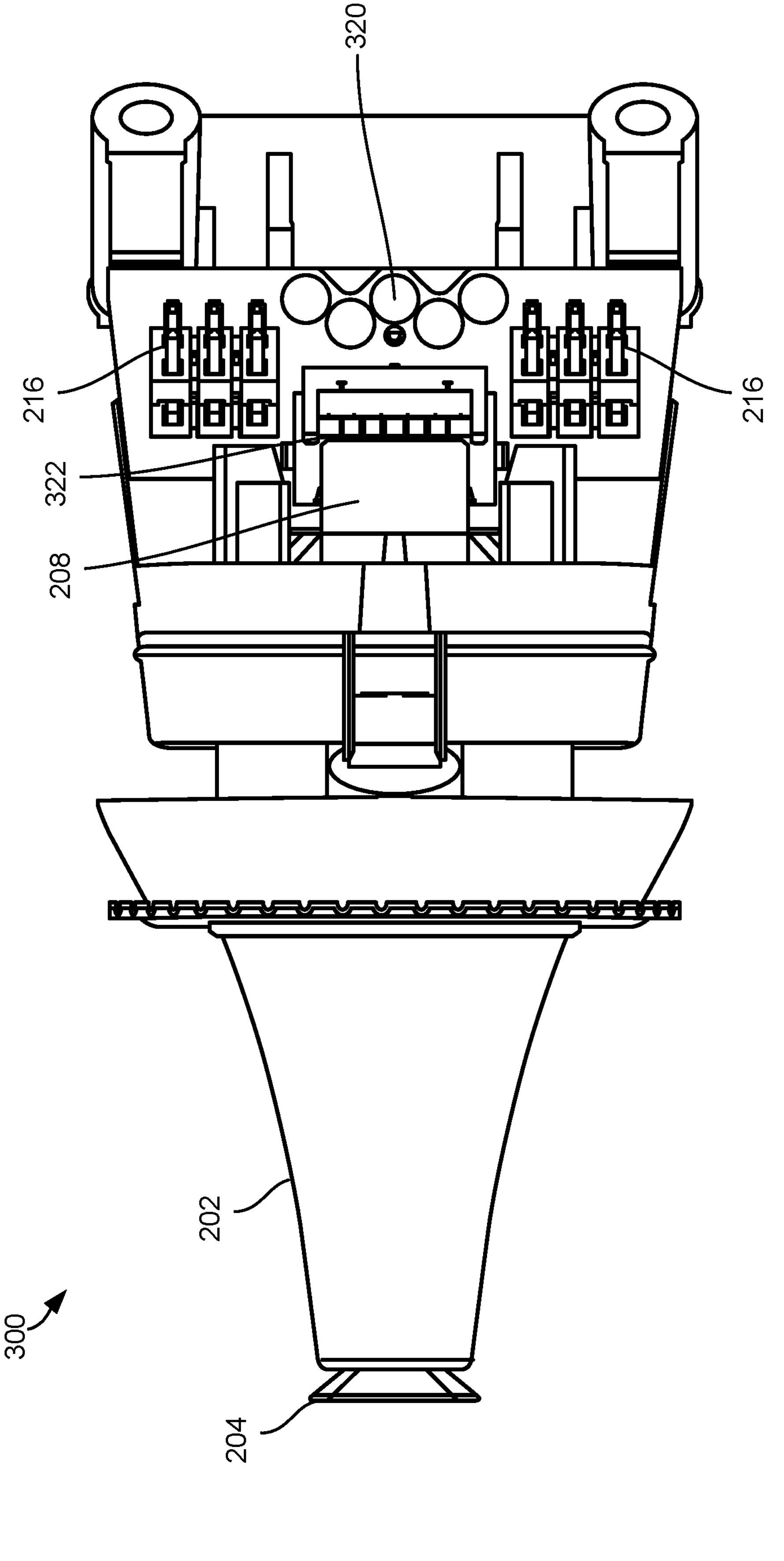
FIG. 3 illustrates a top view of a portion of the temperature measurement device of FIG. 1, according to at least one example.

FIG. 3 illustrates a top view of a portion 300 of the temperature measurement device of FIG. 1, according to at least one example. The portion 300 may include at least a portion of the head 118 that may be assembled as a subassembly of the temperature device 110. The portion 300 includes the body 202, aperture 204, connections 216, and flexible circuit 208 as described with respect to FIG. 2 above.

The portion 300 shows additional connections for accessing data as well as interacting with the components coupled with the flex circuit 208 after assembly of the portion 300. In particular, data connections 320 and a data interface 322 provide electrical and/or data connectivity to the flex circuit 208 to interface with one or more pins or communication channels of the flex circuit 208. The data connections 320 may provide contacts for coupling to a calibration, testing, or other device that may calibrate and/or read and/or write data to the memory device 210. For instance, for calibration of the portion 300, a calibration procedure may be performed with a calibration device connected to the data connections 320, thereby providing access to the memory device 210 to add calibration coefficients for storage and use by the device. In some examples, the connections 216 may be used for electrical and data connections for purposes of using the device, while the data connections 320 may enable writing and direct access to the memory device 210 for calibration and testing. In some examples, the connections 216 may not provide access to read and/or write to the memory device 210 but may instead receive signals from an integrated circuit and/or voltage signals from the temperature sensing element. The data interface 322 may provide connections from the body 202 to the flex circuit 208 for various purposes as described herein.

FIG. 4 illustrates a temperature sensing element 400, according to at least one example. The temperature sensing element 400 may be an example of the temperature sensing element 150 of FIG. 1. The temperature sensing element 400 includes a sensor 402, such as the sensor 132 and/or sensor 206, flex circuit 404, interface 408 for communicating with other components of a temperature device, and a memory device 412 that may store information such as calibration data 420 as discussed herein.

The flex circuit 404 may be a flexible PCB and includes connections 414 that provide electrical and/or data connections between devices and components coupled to the flex circuit 404. The flex circuit 404 may include a first end 422 coupled to the sensor 402 and a second end 424 opposite the first end 422. The second end 424 may include the interface 408. The flex circuit 404 has a first lateral edge extending from the first end 422 to the second end 424 and a second lateral edge opposite the first lateral edge, the second lateral edge extending from the first end 422 to the second end 424.

The flex circuit 404 has a variable width over the length of the flex circuit 404 from the first end 422 to the second end 424. For example, the flex circuit 404 has a first width at and/or proximate the first end 422, measured from the first lateral edge extending across the width of the flex circuit 404 to the second lateral edge. The flex circuit 404 also has a second width at and/or proximate a location 426 where the memory device 412 couples to the flex circuit 404, extending from the first lateral edge across the flex circuit 404 to the second lateral edge. The flex circuit 404 also has a third width at and/or proximate the second end 424, extending from the first lateral edge across the flex circuit 404 to the second lateral edge. In some examples, the second width, at and/or proximate the location for the memory device 412 to couple, positioned between the first end 422 and the second end 424, may be greater than both the first width and the third width such that the flex circuit may be supported by internal geometry of the temperature device 110 when assembled. In this manner, the flex circuit may provide stabilizing wings and/or supports to support the flex circuit in place within the head 118.

The flex circuit 404 also includes a first stiffener 406 and a second stiffener 410 where the thickness of the flex circuit 404 is greater than surrounding portions of the flex circuit 404. The first stiffener 406 is at and/or proximate the interface 408 at the second end 424 to increase a stiffness of the flex circuit 404 locally and thereby enable easier connection to the electrical and/or data connections. The first stiffener 406 may include stiffeners known for use with flex circuits for providing mechanical strength and rigidity to the flex circuit for particular purposes. For example, the first stiffener 406 may include a second material different from and/or identical to a material forming the flex circuit 404 adhered and/or applied to the flex circuit 404 in the designated location. In some examples, in place of an adhered stiffener, the flex circuit 404 may have a varying thickness for a substrate thereof. In an illustrative example, the stiffener may increase the thickness of the substrate, for example by 20%, 50%, 75%, 100%, or more depending on the desired mechanical rigidity and strength.

The flex circuit 404 also includes a second stiffener 410 at and/or proximate the location 426 where the memory device 412 couples to the flex circuit 404. The second stiffener 410 may increase the mechanical strength and rigidity at and around the memory device 412 to ensure that the memory device 412 doesn't disconnect from the flex circuit 404 unintentionally. Additionally, the second stiffener 410 may provide mechanical support within the body of the temperature device 110. The second stiffener 410 extends across the width of the flex circuit 404 to create support edges 416 provide stabilizing support to rest against internal features of the head 118. The second stiffener 410 may also include stiffeners known for use with flex circuits for providing mechanical strength and rigidity to the flex circuit 404 for particular purposes. For example, the second stiffener 410 may include a second material different from and/or identical to a material forming the flex circuit adhered and/or applied to the flex circuit in the designated location. In some examples, in place of an adhered stiffener, the flex circuit may have a varying thickness for a substrate thereof. In an illustrative example, the stiffener may increase the thickness of the substrate, for example by 20%, 50%, 75%, 100%, or more depending on the desired mechanical rigidity and strength.

The flex circuit also defines an alignment hole 418 that may be used to align the flex circuit 404 within the head 118 as well as retain the flex circuit 404 in position. The flex circuit 404 may be used to align the sensor 402 within the body of the device as well as the interface 408 such that the sensor 402 aligns with the aperture of the head 118 and the interface 408 enables power and electrical connections. The alignment hole 418 is positioned within the flex circuit 404 such that a pin or fastener may insert through the alignment hole 418 and prevent the flex circuit from moving along a direction within the plane of the flex circuit 404. Additionally, the use of the alignment hole 418 may ensure that the support edges 416 contact the internal features of the head 118 to support the flex circuit 404 in the correct position.

FIG. 5 illustrates views of a temperature sensing element 500, according to at least one example. The temperature sensing element 500 may be similar and/or identical to the temperature sensing element 150 and/or temperature sensing element 400. The temperature sensing element 500 is depicted in a back view 502, a side view 520 and a top view 524 in FIG. 5. The temperature sensing element 500 includes a sensor 504 such as the sensor 132 and/or sensor 206 as well as a memory device 526 similar and/or identical to the memory device 412 and also includes an interface 516 similar and/or identical to the interface 408 of FIG. 4. The temperature sensing element 500 further includes a flex circuit 506 similar and/or identical to the flex circuit 404 described with respect to FIG. 4.

The flex circuit 506 is a flexible PCB and includes the interface 516 and sensor 504 coupled thereto, for example through connections 518 to couple the sensor electrically and physically 504 to the flex circuit 506. The flex circuit 506 has a first end proximate the interface 516 and a second end proximate the sensor 504. The flex circuit 506 has a first lateral edge 534 extending from the first end to the second end and a second lateral edge 536 opposite the first lateral edge 534, the second lateral edge 536 extending from the first end to the second end. The flex circuit 506 also defines an alignment hole 508 that may be used to align the flex circuit 506 within the device, such as described with respect to the alignment hole 418 of FIG. 4. The flex circuit 506 has an axis 528 that aligns with a center of the flex circuit 506 and extends from the first end to the second end. In some examples, the alignment hole 508 is aligned and/or centered on the axis 528.

The flex circuit 506 has a variable width over the length of the flex circuit 506 from the first end to the second end, the width measured perpendicular to axis 528. For example, the flex circuit 506 has a first width W1 and/or proximate the first end, measured from the first lateral edge 534 extending across the width of the flex circuit 506 to the second lateral edge 536. The flex circuit 506 also has a second width W2 at and/or proximate a location where the memory device 526 couples to the flex circuit 506, extending from the first lateral edge 534 across the flex circuit 506 to the second lateral edge 536. The flex circuit 506 also has a third width W3 at and/or proximate the second end, extending from the first lateral edge 534 across the flex circuit 506 to the second lateral edge 536. As depicted, the second width W2 is greater than the first width W1 and the third width W3. The third width W3 is also less than the first width W1.

The second width W2 may extend to form support edges 512 and 514 such that the flex circuit may be supported by internal geometry of the device when assembled. In this manner, the flex circuit 506 may provide stabilizing wings and/or supports to support the flex circuit 506 in place within the head. The flex circuit 506 also includes, at the location of the second width, a stiffener 510. The stiffener 510 may increase the mechanical strength and rigidity at and around the memory device 526 to ensure that the memory device 526 doesn't disconnect from the flex circuit 506 unintentionally. Additionally, the stiffener 510 may provide mechanical support within the body of the device. The stiffener 510 extends across the second width W2 encompassing the support edges 512 and 514. In some examples, the stiffener 510 may extend only partway across the second width W2, and may not reach the first lateral edge 534 and second lateral edge 536 but may instead cover a portion of the second width W2. The stiffener 510 may also include stiffeners known for use with flex circuits for providing mechanical strength and rigidity to the flex circuit 506 for particular purposes. The stiffener 510 may have a thickness that increases the thickness of the flex circuit 506 at the location of the stiffener 510.

The flex circuit 506 also includes a stiffener 532 at and/or proximate the interface 516 increase a stiffness of the flex circuit 506 locally and thereby enable easier connection to the electrical and/or data connections. The stiffener 532 may include stiffeners known for use with flex circuits for providing mechanical strength and rigidity to the flex circuit for particular purposes.

Figure 6:
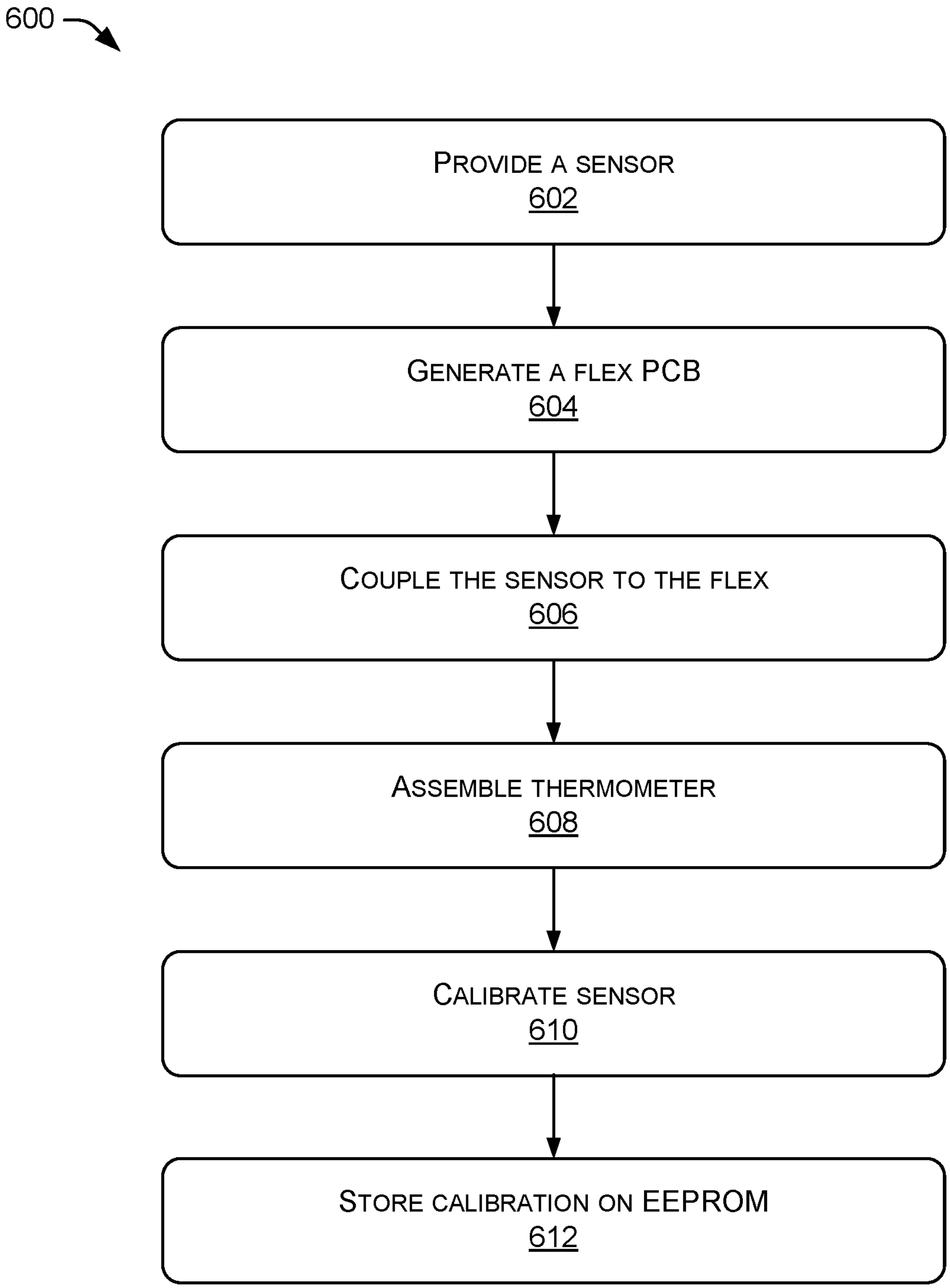
FIG. 6 illustrates an example process for producing a temperature sensing element, according to at least one example.

FIG. 6 illustrates a processes for producing a temperature sensing element. The process is illustrated as a collection of blocks in logical flow diagrams, which represent a sequence of operations, some, or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 6 illustrates an example process 600 for producing a temperature sensing element, according to at least one example. At 602, the process 600 includes providing a sensor. The sensor may include the sensor 132, sensor 206, and/or other sensors described herein, such as sensors to detect a physiological parameter, such as a temperature of a patient. Additional components may be provided such as a memory device to associate with the sensor as well as other components to perform processing of data from the sensor.

At 604, the process 600 includes generating a flex PCB. The flex PCB may be printed, cut, or otherwise formed so as to provide electrical connections between components connected thereto. The flex PCB may have a shape and configuration as shown and described with respect to the flex circuit 404 and/or flex circuit 506 of FIGS. 4 and 5 herein. The flex PCB may include the geometry of the flex circuits 404 and/or 506 as well as other components including the interface, connections, alignment hole, stiffeners, and other such components.

At 606, the process 600 includes coupling the sensor to the flex PCB. The sensor, memory, and other such components may be soldered or otherwise affixed to the flex PCB. At 608, the thermometer, such as the temperature device 110 may be assembled. The temperature device 110 may be assembled in stages, with different modules or subassemblies. For example, the head 118 may be assembled by placing the flex circuit with the sensor, memory, and interface connected thereto within the body 202 and securing the flex circuit through the alignment hole. The body 202 may be assembled into a subassembly that may then be connected to a handle portion or other components of the temperature device 110.

At 610, the sensor may be calibrated. The sensor may be calibrated separately from the thermometer, such as before assembly in a first calibration process. In some examples, the first calibration process may occur prior to inserting the flex circuit into the body of the thermometer. In some examples, the sensor and memory may be coupled to the flex circuit and then calibrated after coupling to the flex circuit, with calibration coefficients stored in the on-board memory through the interface of the flex circuit at 612. The sensor may be calibrated at various temperature ranges, for example room temperature, based on an intended use for the temperature device and the coefficients related to the calibration may be stored on the memory device. In some examples, the memory device includes the calibration coefficients as well as offsets used for calibrating the sensor. In this manner, the sensor may be calibrated, for example with a first calibration, prior to assembling the thermometer. The first calibration may then be stored on the memory device. Additionally, the sensor may be calibrated after assembly into the thermometer, with the second calibration occurring and having second calibration data stored on the memory device. In some examples, the first and second calibrations may include different calibrations steps and processes and/or different temperature ranges for calibrating the sensor. For example, the first calibration may calibrate the sensor to a wide temperature range, such as a temperature range of fifty degrees Celsius, or more, while the second calibration may calibrate the sensor to a narrow range, such as less than ten degrees Celsius. In this manner, the sensor may be calibrated for high accuracy within the range of the second calibration. The memory device may also store identifier data that may include information related to a calibration station, calibration process, date of manufacture, unique ID, and other such information related to the specific temperature sensing element.

Other embodiments of description will be apparent to those skilled in the art from consideration of the specification and practice of the examples described herein. It is intended that the specification and examples be considered as example only, with a true scope and spirit of the present disclosure being indicated by the following claims.

What is claimed is:

1. A temperature measurement device, comprising:
- a body;
- an interface including a component configured to receive an input associated with a temperature measurement of a patient; and
- a temperature sensing element enclosed within the body, comprising;
  - a temperature sensor configured to detect a temperature of the patient in response to the input;
  - a flex circuit including:
    - a first end having a first width coupled to the temperature sensor,
    - a middle section having a second width and extending from the first end in a direction away from the first end, and a second end having a third width and extending from the middle section in the direction, the second end including an electrical connection and a data connection; and a memory device coupled to the middle section of the flex circuit and the data connection, wherein the memory device stores data used to determine the temperature of the patient based on data from the temperature sensor, and the second width is greater than the first width and the third width.

2. The temperature measurement device of claim 1, wherein the temperature sensor is an infrared temperature sensing element configured to sense a temperature inside a body cavity of the patient.

3. The temperature measurement device of claim 1, wherein the memory device stores first calibration data from a first calibration process for the temperature sensor.

4. The temperature measurement device of claim 3, wherein the memory device stores second calibration data from a second calibration process for the temperature measurement device.

5. The temperature measurement device of claim 1, wherein the memory device stores calibration data comprising first calibration data of the temperature sensor and second calibration data for the temperature measurement device based at least in part on a target temperature range.

6. The temperature measurement device of claim 5, wherein the calibration data is communicated to and written to the memory device over the data connection.

7. The temperature measurement device of claim 1, wherein the flex circuit further comprises a first stiffener proximate the memory device and a second stiffener proximate the electrical connection or the data connection.

8. The temperature measurement device of claim 7, wherein the first stiffener extends across the second width from a first lateral edge of the flex circuit to a second lateral edge of the flex circuit and the second stiffener extends across at least a portion of the third width proximate the second end.

9. A sensing component, comprising:

a temperature sensor configured to detect a temperature of a target;

a memory device that stores data used to determine the temperature of the target based on data from the temperature sensor; and a flex circuit coupled to the temperature sensor and the memory device, the flex circuit providing an electrical connection and a data connection to the temperature sensor and the memory device, the flex circuit including:

a first end having a first width coupled to temperature sensor, a middle section coupled to the memory device, the middle section having a second width and extending from the first end in a direction away from the first end, and a second end having a third width and extending from the middle section in the direction, wherein the second width is greater than the first width and the third width.

10. The sensing component of claim 9, wherein the temperature sensor comprises an infrared temperature sensing element.

11. The sensing component of claim 9, wherein the flex circuit further comprises a first stiffener adhered to the flex circuit proximate the memory device and a second stiffener adhered to the flex circuit proximate the second end.

12. The sensing component of claim 11, wherein:

the first stiffener extends across the second width from a first lateral edge of the flex circuit to a second lateral edge of the flex circuit;

the second stiffener extends across at least a portion of the third width proximate the second end; and the flex circuit, the first stiffener, and the second stiffener are configured to support the sensing component within a body of a temperature sensing device.

13. The sensing component of claim 9, wherein the memory device stores first calibration data from a first calibration process for the temperature sensor.

14. The sensing component of claim 13, wherein the memory device further stores second calibration data from a second calibration process for a temperature measurement device including the sensing component.

15. A method of manufacturing a temperature measurement device, comprising:

providing a temperature sensing element configured to detect a patient temperature of a patient;

providing a flex circuit and coupling the temperature sensing element to the flex circuit;

providing a memory device and coupling the memory device to the flex circuit, wherein the flex circuit includes:

a first end having a first width coupled to the temperature sensing element, a middle section coupled to the memory device, the middle section having a second width and extending from the first end in a direction away from the first end, and a second end having a third width and extending from the middle section in the direction, the second end including an electrical connection and a data connection;

programming calibration data to the memory device, the calibration data for determining the patient temperature from sensor data; and programming a controller to determine the patient temperature based on the sensor data and the calibration data.

16. The method of claim 15, wherein the providing the flex circuit comprises providing a stiffener by adhering a stiffener proximate a location for the memory device, the stiffener extending across the second width of the flex circuit, and wherein providing the memory device comprises coupling the memory device to the middle section of the flex circuit and the stiffener, the flex circuit and stiffener configured to support the temperature measurement device within a body of a thermometer.

17. The method of claim 15, wherein programming the calibration data comprises determining first calibration data for a reference temperature of the temperature sensing element and determining unit calibration data for the temperature measurement device.

18. The temperature measurement device of claim 1, wherein the flex circuit further comprises an aperture extending therethrough, wherein the aperture is configured to accommodate at least one of a fastener or a pin.

19. The sensing component of claim 9, wherein the flex circuit further comprises an aperture extending therethrough, wherein the aperture is configured to accommodate at least one of a fastener or a pin.

20. The method of claim 15, wherein the flex circuit further comprises an aperture extending therethrough, wherein the aperture is configured to accommodate at least one of a fastener or a pin.

* * * * *